United States Patent Office.

J. H. GILES, OF NEW YORK, N. Y.

Letters Patent No. 89,574, dated May 4, 1869.

IMPROVEMENT IN ENAMELLING STONE AND EARTHENWARE.

The Schedule referred to in these Letters Patent and making part of the same.

*To all whom it may concern:*

Be it known that I, J. H. GILES, of the city, county, and State of New York, have invented a new and useful Improvement in Enamelling Stone and Earthenware; and I do hereby declare that the following is a full, clear, and exact description thereof, which will enable others skilled in the art to understand the same.

My invention has for its object to furnish an improvement in the process of enamelling stone and earthenware, by means of which I am enabled to use a clay of a tighter body than can be done when the clays heretofore use for this purpose are employed, and by which I am also enabled to form a black, or "Albany" enamel upon one surface, as the outside, and a white enamel upon the other surface, as the inside of the vessel being manufactured; and It consists in the process hereinafter more fully described.

The tight-bodied clay, while being, or at the time of being ground, is mixed with sand, or loam, or with a mixture of sand and loam, in about the proportion of one bushel of said sand or loam, or mixture of sand and loam, to eight bushels of the said clay.

The vessels are then formed in the ordinary manner, and are partially air-dried.

Before the vessels are fully dried, the surface to which the white enamel is to be applied is coated with a wash, or slip of flint, spar, and white clay, prepared as follows:

I take seven inches, or parts of powdered flint, two inches, or parts of powdered spar, and seven inches, or parts of white clay, which I mix together, and dilute with water, sufficiently to form a slip, or wash.

This slip, or wash is then poured into the vessel, which is turned about, until the inner surface is wholly coated, when the surplus wash is poured out.

In case the outer surface of the vessel is to receive the white enamel, the said vessel is dipped into the said slip, or wash, so as to coat its entire outer surface.

After this slip, or wash has been applied, the air drying of the vessel is completed.

The enamel, or glazing is then applied, as follows:

This enamel is thus prepared: I take seven pounds of common white lead, powdered; four pounds of pow dered spar; one and a half pound of powdered flint.

These ingredients I grind, and thoroughly mix together, dilute with water, and apply to the surface to be enamelled, in the same manner as the first wash was applied.

The outer, or other surface is then coated with the "Albany," or black slip, in the ordinary manner.

The vessels are then placed in the oven, or kiln, and burned with one firing, and in the ordinary manner, except that less heat is required than in the case of ordinary stone-ware, and more heat than in the case of ordinary earthenware, this medium heat being sufficient for the body and for both the enamels.

Having thus described my invention,

I claim as new, and desire to secure by Letters Patent—

The process of enamelling, substantially as herein described and set forth.

The above specification of my invention signed by me, this 1st day of October, 1868.

J. H. GILES.

Witnesses:
ALEX. F. ROBERTS,
JAMES T. GRAHAM.